United States Patent
Lim et al.

(10) Patent No.: US 9,922,262 B2
(45) Date of Patent: Mar. 20, 2018

(54) METHOD AND APPARATUS FOR TRACKING TARGET OBJECT

(71) Applicants: SAMSUNG ELECTRONICS CO., LTD., Suwon-si (KR); POSTECH ACADEMY-INDUSTRY FOUNDATION, Pohang-si (KR)

(72) Inventors: Taegyu Lim, Seoul (KR); Bohyung Han, Pohang-si (KR); Seunghoon Hong, Pohang-si (KR)

(73) Assignees: SAMSUNG ELECTRONICS CO., LTD., Suwon-si (KR); POSTECH ACADEMY-INDUSTRY FOUNDATION, Pohang-si (KR)

( * ) Notice: Subject to any disclaimer, the term of this patent is extended or adjusted under 35 U.S.C. 154(b) by 148 days.

(21) Appl. No.: 14/963,856

(22) Filed: Dec. 9, 2015

(65) Prior Publication Data
US 2016/0171301 A1    Jun. 16, 2016

(30) Foreign Application Priority Data
Dec. 10, 2014  (KR) .......................... 10-2014-0177828

(51) Int. Cl.
*G06K 9/00* (2006.01)
*G06K 9/32* (2006.01)
(Continued)

(52) U.S. Cl.
CPC ......... *G06K 9/3241* (2013.01); *G06K 9/6296* (2013.01); *G06T 7/246* (2017.01);
(Continued)

(58) Field of Classification Search
None
See application file for complete search history.

(56) References Cited

U.S. PATENT DOCUMENTS

2006/0280335 A1*  12/2006  Tomita, Jr. ............. G06T 7/251
                                                    382/103
2014/0010407 A1     1/2014  Sinha et al.
2015/0347846 A1*  12/2015  Guzm n-Rivera ... G06K 9/6256
                                                    382/103

FOREIGN PATENT DOCUMENTS

WO    2008/008046 A1    1/2008

OTHER PUBLICATIONS

Communication dated Jan. 21, 2016, issued by the Korean Intellectual Property Office in counterpart Korean Application No. 10-2014-0177828.

(Continued)

*Primary Examiner* — Weiwen Yang
(74) *Attorney, Agent, or Firm* — Sughrue Mion, PLLC

(57) ABSTRACT

A method by which a tracking apparatus tracks a target object includes: acquiring a first tree structure indicating a tracking processing order of frames, each frame including a tracking area in which the target object is located; acquiring a plurality of frame groups, each frame group consisting of two frames, and acquiring distance evaluation values of the respective frame groups; acquiring a second tree structure based on the first tree structure and the distance evaluation values; and tracking the target object based on the acquired second tree structure, wherein the distance evaluation value is determined based on at least one of locations of tracking areas included in two frames belonging to the frame group and pixel values included in the tracking areas.

14 Claims, 12 Drawing Sheets

(51) Int. Cl.
*G06K 9/62* (2006.01)
*G06T 7/246* (2017.01)

(52) U.S. Cl.
CPC . *G06K 9/00785* (2013.01); *G06K 2009/3291* (2013.01); *G06T 2207/10016* (2013.01); *G06T 2207/20072* (2013.01); *G06T 2207/30236* (2013.01)

(56) References Cited

OTHER PUBLICATIONS

Communication dated Mar. 22, 2016, issued by the Korean Intellectual Property Office in counterpart Korean Application No. 10-2014-0177828.
Seunghoon Hong and Bohyung Han; "Visual Tracking by Sampling Tree-Structured Graphical Models", ECCV '14, Surich, Sep. 6-12, 2014, Total 1 page.
Bao et al., "Real Time Robust L1 Tracker Using Accelerated Proximal Gradient Approach", Proceedings of the 2012 IEEE Conference on Computer Vision and Pattern Recognition, 2012, 8 pages total.
Pan et al., "Visual Tracking Using High-Order Monte Carlo Markov Chain", 15th IEEE International Conference on Image Processing, Oct. 12-15, 2008, 5 pages total.
Kwon et al., "Tracking of Abrupt Motion Using Wang-Landau Monte Carlo Estimation", 10th European Conference on Computer Vision, Oct. 12-18, 2008, 14 pages total.
Nam et al., "Online Graph-Based Tracking", Computer Vision—ECCV 2014, 13th European Conference, Sep. 6-12, 2014, 15 pages total.
Hong et al., "Visual Tracking by Sampling Tree-Structured Graphical Models", Computer Vision—ECCV 2014, 13th European Conference, Sep. 6-12, 2014, 16 pages total.
Hong et al., "Orderless Tracking through Model-Averaged Posterior Estimation", 2013 IEEE International Conference on Computer Vision (ICCV), Dec. 1-8, 2013, 8 pages total.
Korman et al., "Coherency Sensitive Hashing", 2011 IEEE International Conference on Computer Vision, Nov. 6-13, 2011, 8 pages total.
Uchida et al., "Analytical Dynamic Programming Tracker", Computer Vision—ACCV 2010, 10th Asian Conference on Computer Vision, Nov. 8-12, 2010, 14 pages total.

* cited by examiner

[LINEAR MODEL]

[HIGH-ORDER MARKOV MODEL]

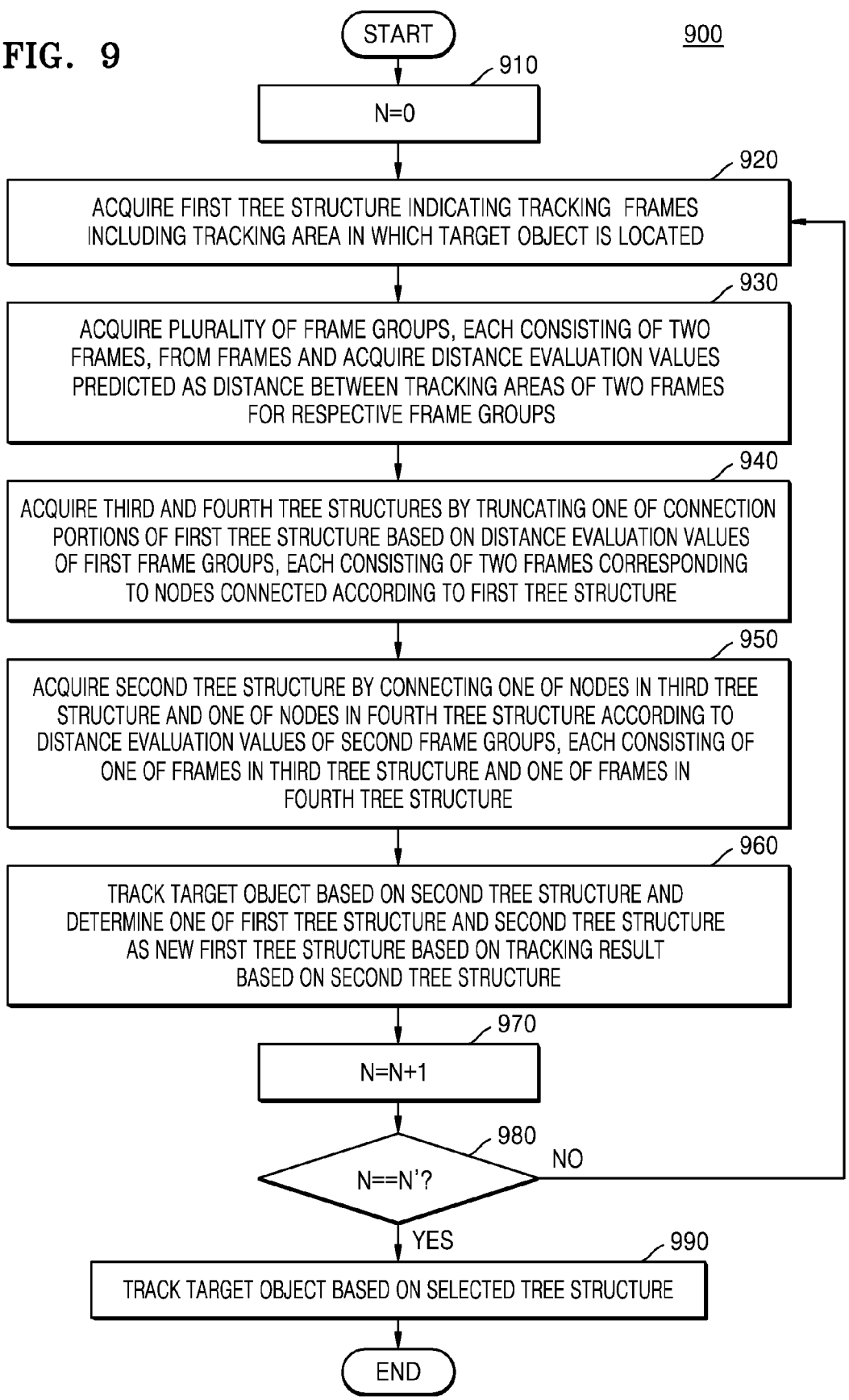

METHOD AND APPARATUS FOR TRACKING TARGET OBJECT

CROSS-REFERENCE TO RELATED APPLICATION

This application claims priority from Korean Patent Application No. 10-2014-0177828, filed on Dec. 10, 2014, in the Korean Intellectual Property Office, the disclosure of which is incorporated herein by reference in its entirety.

BACKGROUND

1. Field

Methods and apparatuses consistent with exemplary embodiments relate to tracking a target object in a video, and more particularly, to a method and apparatus for tracking a target object by optimizing a tree structure of frames included in a video.

2. Description of the Related Art

Techniques of tracking a target object in an image with a visual signal have been researched. However, most of the existing techniques are based on tracking algorithms based on a linear structure model. The linear structure model is simple and requires minimal computation. Thus, the linear structure model is suitable for inline tracking algorithms of processing a newly input frame based on an existing frame in real-time.

A graph model that is more complex than the linear structure model and uses more computation may be applied to offline tracking algorithms capable of tracking a target object with a sufficient time by receiving a plurality of frames and online tracking algorithms for which a time delay is accepted. Therefore, to increase tracking accuracy in the offline tracking algorithms and the online tracking algorithms for which a time delay is accepted, a new graph model may be developed and a method of optimizing the graph model may be employed.

SUMMARY

Exemplary embodiments address at least the above disadvantages and other disadvantages not described above. Also, the exemplary embodiments are not required to overcome the disadvantages described above, and may not overcome any of the problems described above.

Aspects of one or more exemplary embodiments relate to a method and an apparatus for tracking a target object in an input image.

Aspects of one or more exemplary embodiments relate to a non-transitory computer-readable medium having recorded thereon a computer-readable program for executing a tracking method according to one or more exemplary embodiments.

Additional aspects will be set forth in part in the description that follows and, in part, will be apparent from the description, or may be learned by practice of the exemplary embodiments.

According to an aspect of an exemplary embodiment, there is provided a method by which a tracking apparatus tracks a target object in an image, the method including: acquiring a first tree structure indicating an order of analyzing a plurality of frames, each frame including a tracking area in which the target object is located; acquiring a plurality of frame groups, each frame group consisting of two frames, from the plurality of frames, and acquiring a distance evaluation value of each frame group; acquiring a second tree structure based on the first tree structure and the distance evaluation values; and tracking the target object based on the acquired second tree structure, wherein each distance evaluation value is determined based on at least one of locations of tracking areas included in two frames belonging to each frame group and pixel values in the tracking areas.

The first tree structure and the second tree structure may include a plurality of nodes corresponding to the plurality of frames and connection portions for connecting the nodes, and wherein the target object in each frame corresponding to each node may be tracked in a connection order to a root node by tracking the target object from the frame corresponding to the root node.

The method may include tracking the target object based on the second tree structure and selecting one of the first tree structure and the second tree structure as a new tree structure based on a result of the tracking the target object based on the second tree structure.

The acquiring of the second tree structure may include deleting a connection portion of the first tree structure and generating a new connection portion based on the distance evaluation values.

The acquiring of the second tree structure may include: acquiring a third tree structure and a fourth tree structure by truncating one of the connection portions in the first tree structure according to the distance evaluation values of first frame groups, each first frame group consisting of two frames corresponding to connected nodes in the first tree structure; and acquiring the second tree structure by connecting a node in the third tree structure and a node in the fourth tree structure according to distance evaluation values of second frame groups, each second frame group consisting of a frame in the third tree structure and a frame in the fourth tree structure.

The acquiring of the third tree structure and the fourth tree structure may include determining truncation probabilities of the connection portions of the first tree structure according to the distance evaluation values of the first frame groups, and truncating at least one of the connection portions based on the determined truncation probabilities, and the acquiring of the second tree structure may include determining connection probabilities according to the distance evaluation values of the second frame groups, and connecting a node in the third tree structure and a node in the fourth tree structure based on the connection probabilities.

The acquiring of the distance evaluation values may include dividing a tracking area of a first frame of each frame group into a predetermined number of first divided areas, acquiring second areas matched with the first divided areas of the first frame from a second frame of each frame group, and acquiring a distance evaluation value based on locations of the second divided areas and a location of the tracking area.

The selecting may include: determining a tree energy based on a dissimilarity between tracking areas included in two frames in the second tree structure; determining an acceptance ratio for determining a probability that the second tree structure is selected as the new tree structure, based on the tree energy of the first tree structure and the tree energy of the second tree structure; and selecting the new tree structure from the first tree structure and the second tree structure based on the acceptance ratio.

The tracking of the target object may include tracking the target object according to the first tree structure acquired by iterating the acquiring of the first tree structure, the acquiring of the distance evaluation values, the acquiring of the second tree structure, and the selecting of the first tree structure.

According to an aspect of another exemplary embodiment, there is provided a tracking apparatus for tracking a target object in an image, the tracking apparatus including: a first tree structure acquirer configured to acquire a first tree structure indicating an order of analyzing a plurality of frames, each frame including a tracking area in which the target object is located; a distance evaluation value acquirer configured to acquire a plurality of frame groups, each frame group consisting of two frames, from the plurality of frames, and acquire a distance evaluation value of each frame group; a second tree structure determiner configured to acquire a second tree structure based on the first tree structure and the distance evaluation values; and a tracker configured to track the target object based on the acquired second tree structure, wherein each distance evaluation value is determined based on at least one of locations of tracking areas included in two frames belonging to each frame group and pixel values in the tracking areas.

The first tree structure and the second tree structure may include a plurality of nodes corresponding to the plurality of frames, and a plurality of connection portions configured to connect the nodes, and wherein the target object in each frame corresponding to each node may be tracked in a connection order to a root node by tracking the target object from the frame corresponding to the root node.

The apparatus may include a first tree structure selector configured to track the target object based on the second tree structure and select one of the first tree structure and the second tree structure as a new tree structure based on a result of the tracking the target object based on the second tree structure.

The second tree structure determiner may be configured to acquire the second tree structure by deleting a connection portion of the first tree structure and generating a new connection portion based on the distance evaluation values.

The second tree structure determiner may be further configured to acquire a third tree structure and a fourth tree structure by truncating one of the connection portions in the first tree structure according to the distance evaluation values of first frame groups, each first frame group consisting of two frames corresponding to connected nodes in the first tree structure, and acquire the second tree structure by connecting a node in the third tree structure and a node in the fourth tree structure according to distance evaluation values of second frame groups, each second frame group consisting of a frame in the third tree structure and a frame in the fourth tree structure.

The second tree structure determiner may be further configured to: acquire the third tree structure and the fourth tree structure by determining truncation probabilities of the connection portions of the first tree structure according to the distance evaluation values of the first frame groups, and truncating at least one of the connection portions based on the determined truncation probabilities; and acquire the second tree structure by determining connection probabilities according to the distance evaluation values of the second frame groups, and connecting a node in the third tree structure and a node in the fourth tree structure based on the connection probabilities.

The distance evaluation value acquirer may be configured to divide a tracking area of a first frame of each frame group into a predetermined number of first divided areas, acquire second areas matched with the first divided areas of the first frame from a second frame of each frame group, and acquire a distance evaluation value based on locations of the second divided areas and a location of the tracking area.

The first tree structure selector may be configured to: determine a tree energy based on a dissimilarity between tracking areas included in two adjacent frames in the second tree structure, determine an acceptance ratio for determining a probability that the second tree structure may be selected as the new tree structure, based on the tree energy of the first tree structure and the tree energy of the second tree structure, and select the new first tree structure from the first tree structure and the second tree structure based on the acceptance ratio.

The tracker may be configured to track the target object according to the first tree structure acquired by iterating functions of the first tree structure acquirer, the distance evaluation value acquirer, the second tree structure determiner, and the first tree structure selector.

According to an aspect of another exemplary embodiment, there is provided a method of tracking a target object in an image, the method including: obtaining a first tree structure indicating an order of analyzing a plurality of frames, each frame including a tracking area in which the target object is located; obtaining a plurality of frame groups, wherein each frame group includes a pair of adjacent frames; determining a distance evaluation value for each frame group that corresponds to a similarity between a first frame and a second frame in the frame group; obtaining a second tree structure based on the distance evaluation value of each frame group and the first tree structure; tracking the target object according to the obtained second tree structure.

BRIEF DESCRIPTION OF THE DRAWINGS

These and/or other aspects will become apparent and more readily appreciated from the following description of one or more exemplary embodiments, taken in conjunction with the accompanying drawings in which:

FIG. 9 illustrates a flowchart of a method of tracking a target object in a video, according to another exemplary embodiment.

DETAILED DESCRIPTION

Figure 1:
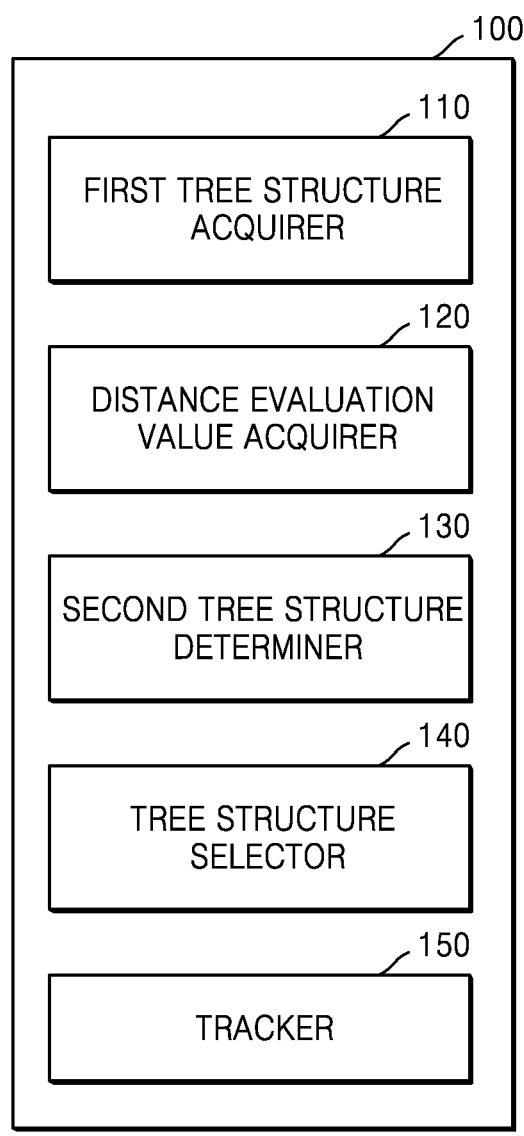
FIG. 1 illustrates a block diagram of an apparatus for tracking a target object in a video, according to an exemplary embodiment.

Reference will now be made in detail to exemplary embodiments, which are illustrated in the accompanying drawings, wherein like reference numerals refer to like elements throughout. Exemplary embodiments may have different forms and should not be construed as being limited to the descriptions set forth herein. Accordingly, exemplary embodiments are merely described below, by referring to the figures, to explain aspects of exemplary embodiments. As used herein, the term "and/or" includes any and all combinations of one or more of the associated listed items. Expressions such as "at least one of," when preceding a list of elements, modify the entire list of elements and do not modify the individual elements of the list.

In the present disclosure, the term "tree structure" may indicate one of the structures of connecting frames. The tree structure includes nodes corresponding to the frames and connection portions for connecting the nodes. A connection portion is marked in an arrow shape to indicate that a tracking process of a target object from an upper node to a lower node is performed. Each upper node may have one or more lower nodes, but each lower node should have one upper node. In addition, nodes in a same level cannot be connected to each other. Therefore, nodes including the uppermost node and a plurality of lower nodes are connected in a tree shape.

When a target object in an image is tracked based on a tree structure, the target object is tracked from a frame corresponding to a root node to a frame corresponding to an upper node and frames corresponding to lower nodes according to a direction mark indicated in connection portions.

FIG. 1 illustrates a block diagram of an apparatus 100 for tracking a target object in a video, according to an exemplary embodiment.

The apparatus 100 may include a first tree structure acquisition unit 110 (e.g., first tree structure acquirer), a distance evaluation value acquisition unit 120 (e.g., distance evaluation value acquirer), a second tree structure determination unit 130 (e.g., second tree structure determiner), a tree structure selection unit 140 (e.g., tree structure selector), and a tracking unit 150 (e.g., tracker).

Although the first tree structure acquisition unit 110 and the distance evaluation value acquisition unit 120 are shown as separate components in FIG. 1, the first tree structure acquisition unit 110 and the distance evaluation value acquisition unit 120 may be integrated and implemented as a single component according to one or more exemplary embodiments. Also, the second tree structure determination unit 130 may also be integrated with at least one of the first tree structure acquisition unit 110 and the distance evaluation value acquisition unit 120.

Although the first tree structure acquisition unit 110, the distance evaluation value acquisition unit 120, the second tree structure determination unit 130, the tree structure selection unit 140, and the tracking unit 150 are located inside the apparatus 100 in FIG. 1, devices in charge of the respective functions of the first tree structure acquisition unit 110, the distance evaluation value acquisition unit 120, the second tree structure determination unit 130, the tree structure selection unit 140, and the tracking unit 150 may not be physically adjacent. Therefore, according to one or more exemplary embodiments, the first tree structure acquisition unit 110, the distance evaluation value acquisition unit 120, the second tree structure determination unit 130, the tree structure selection unit 140, and the tracking unit 150 may be physically separated. The apparatus 100 of FIG. 1 is not limited to a physical device. For example, some of the functions of the apparatus 100 may be implemented by software and/or hardware.

The first tree structure acquisition unit 110 acquires a first tree structure indicating an order of analyzing frames including tracking areas in which the target object is located.

The distance evaluation value acquisition unit 120 acquires a plurality of frame groups, each consisting of two frames, from the frames and acquires a distance evaluation value predicted as a distance between tracking areas of two frames belonging to a frame group for each of the plurality of frame groups. Each of the frame groups includes two frames and has one distance evaluation value.

For example, the distance evaluation value acquisition unit 120 divides a tracking area of a first frame among first and second frames belonging to a frame group into a predetermined number of first divided areas. The distance evaluation value acquisition unit 120 acquires second divided areas matched with the first divided areas of the first frame from the second frame. A distance evaluation value may be calculated based on locations of the acquired second divided areas and a location of the tracking area of the first frame.

The distance evaluation value acquisition unit 120 may acquire the calculated distance evaluation value. Therefore, the distance evaluation value acquisition unit 120 may acquire a pre-calculated distance evaluation value when a process of optimizing the first tree structure for the same frames is iterated, thereby reducing an amount of computation.

The distance evaluation value acquisition unit 120 may determine a representative frame among frames including similar tracking areas and acquire a plurality of representative frame groups, each consisting of two representative frames. Thereafter, the distance evaluation value acquisition unit 120 may acquire distance evaluation values only for the representative frame groups. For example, when tracking areas of first to $20^{th}$ frames are similar and tracking areas of $21^{st}$ to $40^{th}$ frames are similar, the distance evaluation value acquisition unit 120 may determine the first frame as a representative frame of the first to $20^{th}$ frames and determine the $21^{st}$ frame as a representative frame of the $21^{st}$ to $40^{th}$ frames. Thereafter, the distance evaluation value acquisition unit 120 may acquire a representative frame group consisting of the first frame and the $21^{st}$ frame, which are representative frames and acquire only a distance evaluation value of the acquired representative frame group. Therefore, the number of acquitted distance evaluation values is reduced, and thus, a computation amount of the distance evaluation value acquisition unit 120 decreases.

The second tree structure determination unit 130 determines a second tree structure according to the first tree structure and distance evaluation values.

In detail, the second tree structure determination unit 130 may determine the second tree structure by deleting connection portions of the first tree structure and generating new connection portions based on the distance evaluation values.

According to an exemplary embodiment, the second tree structure determination unit 130 may acquire tree structures that are different from the first tree structure, e.g., a third tree structure and a fourth tree structure, by truncating one of connection portions of the first tree structure based on distance evaluation values of first frame groups, each consisting of two frames corresponding to nodes connected by a connection portion according to the first tree structure.

Because a lower node in a tree structure is connected to only one upper node, if a connection portion is truncated, a lower node connected to the truncated connection portion is truncated from an upper node. Therefore, the uppermost node among lower nodes connected to the truncated connection portion becomes a root node of a new tree structure. Accordingly, if one connection portion is truncated, two tree structures are generated.

The second tree structure determination unit 130 may select the largest distance evaluation value among the distance evaluation values of the first frame groups and truncate a connection portion corresponding to the selected distance evaluation value. The larger the distance evaluation value, the higher a probability that tracking areas of two frames belonging to a frame group corresponding to the distance evaluation value are dissimilar to each other. Therefore, when tracking areas are dissimilar to each other, an error due to the dissimilarity of the tracking areas may be propagated to a tracking process in a lower node. Therefore, a connection portion corresponding to a large distance evaluation value may be truncated to prevent propagation of an error due to dissimilarity of tracking areas.

The second tree structure determination unit 130 may determine the second tree structure by truncating a connection portion of the first tree structure based on distance evaluation values to divide the first tree structure into the third tree structure and the fourth tree structure and then connecting one of nodes in the third tree structure and one of nodes in the fourth tree structure according to distance evaluation values of second frame groups, each consisting of one of frames in the third tree structure and one of frames in the fourth tree structure.

The second tree structure determination unit 130 may select the smallest one of the distance evaluation values of the second frame groups and generate a connection portion between one of the nodes in the third tree structure and one of the nodes in the fourth tree structure, which correspond to the selected distance evaluation value. The smaller a distance evaluation value, the higher a probability that tracking areas of two frames belonging to a frame group corresponding to the distance evaluation value are similar to each other. Therefore, when a connection portion for connecting nodes corresponding to frames having similar tracking areas is generated, an error due to dissimilarity of tracking areas may decrease. Accordingly, the second tree structure that is more efficient than the first tree structure may be generated by generating a connection portion between one of the nodes in the third tree structure and one of the nodes in the fourth tree structure, which correspond to the smallest distance evaluation value.

The connection portion to be truncated and the connection portion to be connected may be statistically selected.

According to an exemplary embodiment, the second tree structure determination unit 130 may calculate truncation probabilities of the connection portions of the first tree structure based on the distance evaluation values of the first frame groups and truncate a connection portion determined according to the truncation probabilities.

The second tree structure determination unit 130 may determine the second tree structure by calculating connection probabilities of the frames of the second frame groups based on the distance evaluation values of the second frame groups and connecting one of the nodes in the third tree structure and one of the nodes in the fourth tree structure, for which a connection portion is to be generated according to the connection probabilities.

The second tree structure determination unit 130 may determine various second tree structures by using the truncation probabilities and the connection probabilities.

A method by which the second tree structure determination unit 130 determines the second tree structure will be described in more detail with reference to FIGS. 4A to 4C.

The tree structure selection unit 140 tracks the target object based on the second tree structure and selects one of the first tree structure and the second tree structure based on the tracking result based on the second tree structure.

According to an exemplary embodiment, the tree structure selection unit 140 may determine tree energy based on dissimilarity between tracking areas included in two adjacent frames in the second tree structure. The tree structure selection unit 140 may select a tree structure having lower tree energy from the first tree structure and the second tree structure with a relatively high probability according to the determined tree energy. The tree energy will be described below with reference to FIGS. 5 and 6.

According to an exemplary embodiment, the tree structure selection unit 140 may determine the selected tree structure as a new first tree structure. Thereafter, the first tree structure acquisition unit 110 may acquire the new first tree structure determined by the tree structure selection unit 140. Thereafter, the apparatus 100 may determine another new first tree structure by performing the functions of the distance evaluation value acquisition unit 120, the second tree structure determination unit 130, and the tree structure selection unit 140. The first tree structure may be iteratively acquired by the first tree structure acquisition unit 110, and a new first tree structure may be generated by the tree structure selection unit 140 based on the first tree structure. The first tree structure may be optimized by iterating this process.

The tracking unit 150 tracks the target object according to the selected tree structure.

The target object tracking process described above may be performed by the apparatus 100.

Figure 2A:
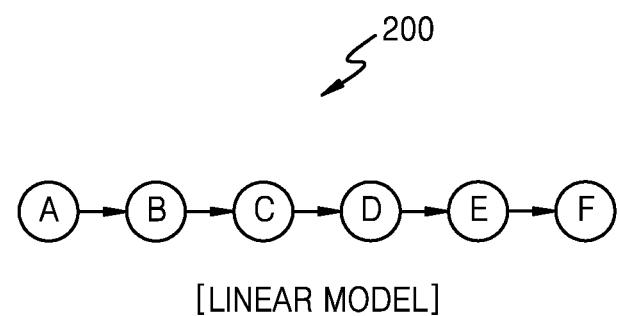
FIGS. 2A and 2B illustrate existing methods of tracking a target object.
Figure 2B:
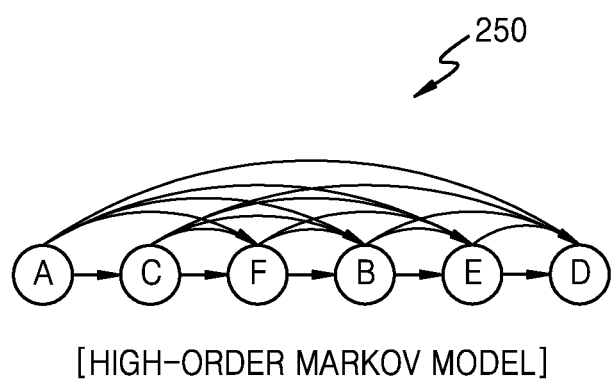

FIGS. 2A and 2B illustrate an existing method of tracking a target object.

FIG. 2A illustrates a linear model 200 among methods of tracking a target object.

In the linear model 200, frames included in an image are arranged in an order of time. Therefore, when a frame A is a first frame, a target object in the frame A is tracked first of all. Thereafter, the target object in a frame B, that is a next frame of the frame A, is tracked based on at least one of a location of a tracking area in which the target object in the frame A is located and pixel values included in the tracking area.

In the linear model 200, if there is a significant difference between a tracking area in which the target object in a previous frame and a tracking area in which the target object in a current frame with respect to locations of the tracking areas and pixels included in the tracking areas, the target object in a current frame is not tracked. For example, if a portion of the target object is hidden by another object in the current frame, a tracking apparatus cannot track, in the current frame, the target object in the previous frame. In addition, if the target object in the current frame is darker than the target object in the previous frame, the tracking apparatus may recognize the target object in the current frame as different from the target object in the previous frame.

That is, in the linear model 200, if there is a sudden change in pixels included in an area where the target object is located, an error may occur, and the error may be propagated to a next frame.

FIG. 2B illustrates a high-order Markov model 250 among methods of tracking a target object.

In the high-order Markov model 250, one frame is connected to a plurality of frames in which the target object is tracked. For example, in the high-order Markov model 250 of FIG. 2B, a frame F is connected to frames A and C, and a frame D to be tracked lastly is connected to frames A, B, C, E, and F.

For the frame F, the target object in the frame F is tracked based on locations of tracking areas where the target object in the frames A and C is located, pixels included in the tracking areas, and the like. Likewise, for the frame D, the target object in the frame D is tracked based on at least one of locations of tracking areas where the target object in the frames A, B, C, E, and F is located and pixels included in the tracking areas.

In detail, for the frame F, an average or a weighted average of pixels included in the tracking areas of the frames A and C may be used, and for the frame D, an average or a weighted average of pixels included in the tracking areas of the frames A, B, C, E, and F may be used.

In the high-order Markov model 250, unlike the linear model 200, the target object is tracked based on a plurality of frames. Thus, the high-order Markov model 250 causes less error than the linear model 200. However, a frame in which a portion of a target object is hidden by another object and a frame in which the target object is darker than that in other frames are not excluded to track the target object in a current frame. Accordingly, the high-order Markov model 250 may propagate an error to a next frame if the error occurs in a previous frame.

Figure 3:
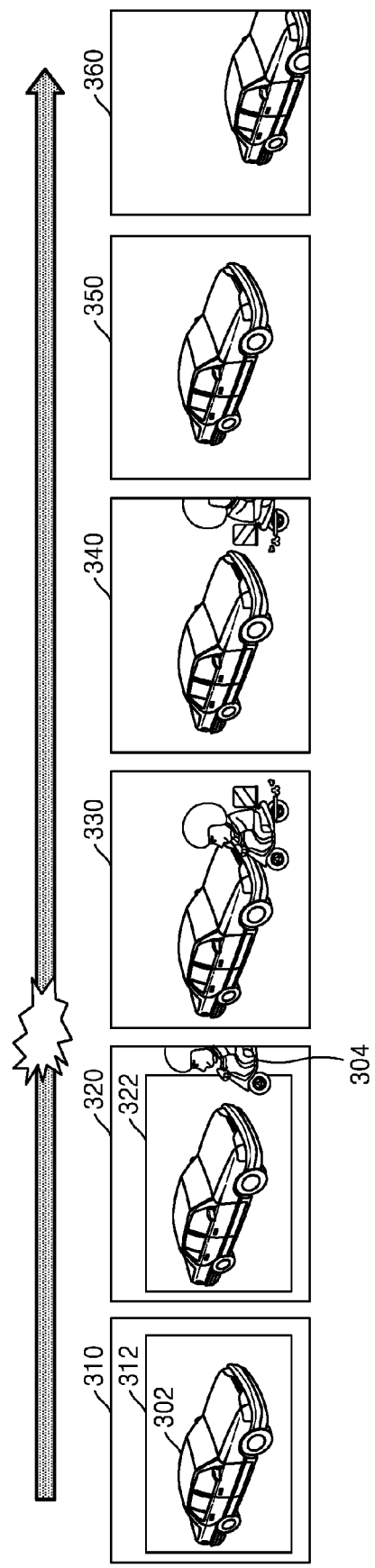
FIG. 3 illustrates an existing method of tracking a target object.

FIG. 3 illustrates an existing method of tracking a target object. In detail, FIG. 3 illustrates a problem of the linear model 200 of FIG. 2A.

In the linear model 200, a tracking apparatus detects an area that is similar to a tracking area of a previous frame from a current frame, based on a location of the tracking area where a target object 302 in the previous frame is located. For example, in frames A, B, C, D, E, and F, (310, 320, 330, 340, 350, and 360), a car that is the target object 302 is shown. The frames A and B (310 and 320) have similar locations of tracking areas 312 and 322 where the target object 302 is located, and similar pixels included in the tracking areas 312 and 322, respectively. Accordingly, the tracking area 322 of the frame B (320) is easily detected from the frame A (310).

However, in the frame C (330), a motorcycle 304 hides a portion of the target object 302. Accordingly, the tracking apparatus cannot detect an area that is similar to the tracking area 322 of the frame B (320) from the frame C (330). Therefore, the tracking apparatus cannot detect the target object 302 from the frame C (330).

This error is propagated to the frames D, E, and F (340, 350, and 360). Therefore, even though the motorcycle 304 does not hide the target object 302 in the frames D, E, and F (340, 350, and 360), the tracking apparatus cannot detect the target object 302 included in the frames D, E, and F (340, 350, and 360).

In the high-order Markov model 250 of FIG. 2B, a target object is tracked by referring to a plurality of frames, and thus, less error occurs compared to the linear model 200. However, as described above, a frame in which a portion of a target object is hidden by another object and a frame in which the target object is darker than that in other frames, and the like, are not excluded.

Figure 4A:
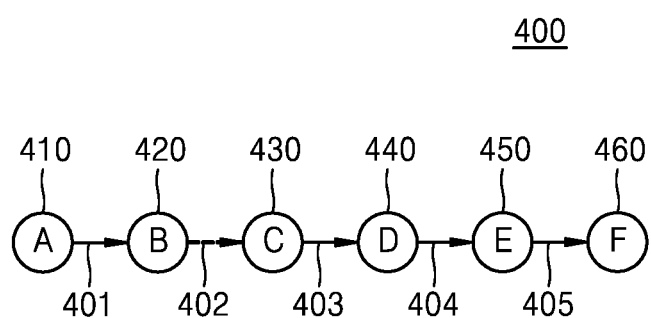
FIGS. 4A to 4C illustrate a method of proposing a new tree structure from an existing tree structure, according to an exemplary embodiment.
Figure 4B:
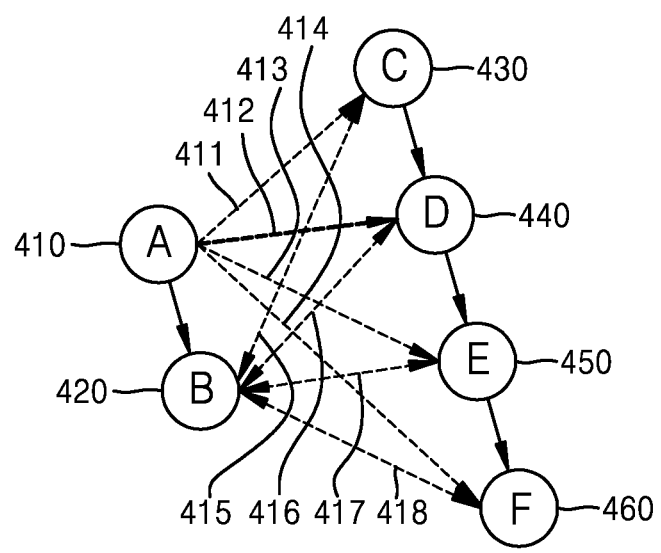
Figure 4C:
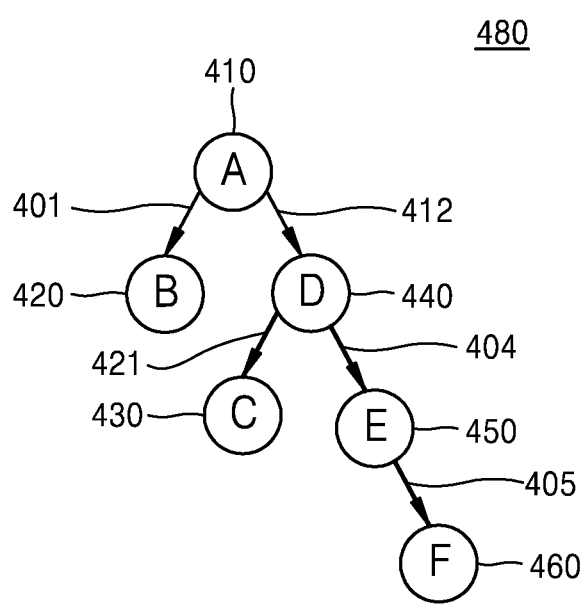

FIGS. 4A to 4C illustrate a method of proposing a new tree structure 480 from an existing tree structure 400.

A method of acquiring the new tree structure 480 includes a connection portion truncation operation, a connection portion generation operation, and a connection portion change operation.

FIG. 4A illustrates the connection portion truncation operation. In FIG. 4A, nodes A, B, C, D, E, and F (410, 420, 430, 440, 450, and 460) form a linearly connected tree structure. The nodes A, B, C, D, E, and F (410, 420, 430, 440, 450, and 460) correspond to frames A, B, C, D, E, and F, respectively. Connection portions 401, 402, 403, 404, and 405 for connecting nodes exist between two nodes, and in the connection portion truncation operation, one of the connection portions 401, 402, 403, 404, and 405 is truncated.

The connection portion truncated in the connection portion truncation operation is determined based on a distance evaluation value between two frames corresponding to two nodes connected through each connection portion. The distance evaluation value may be calculated in a method described below. For example, a tracking area of a first frame of two frames is divided into a predetermined number of first divided areas. Thereafter, second divided areas matched with the first divided areas of the first frame are acquired from a second frame of the two frames. Thereafter, a distance evaluation value may be determined by Equation 1 below based on locations of the second divided areas and a location of the tracking area of the first frame.

$$d(i, j) \equiv \underset{m}{\mathrm{median}}(\|v_i^m - f_{PM}(v_i^m; y_j)\|) \quad (1)$$

In Equation 1, $d(i,j)$ denotes a distance evaluation value between a frame i and a frame j, $v_i^m$ denotes a location of an mth first divided area of the frame i, $f_{PM}(v_i^m;y_j)$ denotes a second divided area of the frame j, which corresponds to $v_i^m$, and $\|v_i^m - f_{PM}(v_i^m;y_j)\|$ denotes a distance vector between $v_i^m$ and $f_{PM}(v_i^m;y_j)$. Therefore, $$\underset{m}{\mathrm{median}}(\|v_i^m - f_{PM}(v_i^m; y_j)\|)$$

denotes a median value of distance vectors between m first divided areas and m second divided areas.

Accordingly, even though an area perfectly corresponding to an overall tracking area of the first frame may not exist in the second frame, the distance evaluation value may be calculated using the second divided areas corresponding to the first divided areas into which the first frame is divided. The distance evaluation value obtained by the method described above is not an actual displacement of a target object but a displacement predicted by a tracking apparatus.

After obtaining distance evaluation values respectively corresponding to the connection portions 401, 402, 403, 404, and 405, a truncation probability of each of the connection portions 401, 402, 403, 404, and 405 is obtained based on the distance evaluation values. The larger a distance evaluation value, the higher a probability that an error occurs in tracking of the target object in the second frame based on the first frame. Therefore, the truncation probability is determined such that a connection portion of which a distance evaluation value is larger is truncated. The truncation probability may be determined by Equation 2.

$$P_{delete}(i, j) = \frac{\exp(d(i, j))}{\Sigma_{(a,b)\in\varepsilon}\exp(d(a, b))}(i, j) \in \varepsilon \quad (2)$$

In Equation 2, $P_{delete}(i,j)$ denotes a truncation probability that a connection portion between nodes corresponding to frames i and j is truncated, $\epsilon$ denotes a set of frame groups to which two frames corresponding to nodes adjacent by the connection portion belong in a tree structure. According to Equation 2, $P_{delete}(i,j)$ is proportional to a value for which a base is a natural constant and an exponent is a distance evaluation value. Therefore, a difference in $P_{delete}(i,j)$ is much larger than a difference in a distance evaluation value.

If truncation probabilities respectively corresponding to the connection portions 401, 402, 403, 404, and 405 are determined, a connection portion to be truncated is determined based on the truncation probabilities. Because the connection portion to be truncated is determined based on the truncation probabilities, a connection portion for which a distance evaluation value is the largest is not necessarily determined as the connection portion to be truncated. Therefore, a connection portion for which a distance evaluation value is small may be truncated.

According to one or more exemplary embodiments, it may be determined that a connection portion corresponding to the largest distance evaluation value is truncated without obtaining truncation probabilities.

In FIG. 4A, the connection portion 402 between the node B (420) and the node C (430) is truncated according to the method described above. Therefore, the existing tree structure 400 is divided into a tree structure consisting of the node A (410) and the node B (420) and a tree structure consisting of the nodes C, D, E, and F (430, 440, 450, and 460).

FIG. 4B illustrates the connection portion generation operation.

In the connection portion generation operation, two tree structures are connected. When the two tree structures are referred to as the third and fourth tree structures, one of nodes in the third tree structure is connected to one of nodes in the fourth tree structure. In the connection portion generation operation, nodes to be connected by a newly generated connection portion are determined based on a distance evaluation value of a frame group corresponding to nodes. The smaller a distance evaluation value, the lower a probability that an error occurs in tracking of a target object. Therefore, a connection probability is determined such that a connection portion is generated between nodes corresponding to a frame group for which a distance evaluation value is small. The connection probability may be determined by Equation 3.

$$P_{add}(i, j) = \frac{\exp(-d(i, j))}{\sum_{(a,b) \in \bar{\epsilon}} \exp(-d(a, b))} (i, j) \in \bar{\epsilon} \quad (3)$$

In Equation 3, $P_{add}(i,j)$ denotes a connection probability that a connection portion is generated between nodes corresponding to frames i and j, and $\bar{\epsilon}$ denotes a set of frame groups to which two frames corresponding to two nodes which are not connected to each other belong in a tree structure. According to Equation 3, $P_{add}(i,j)$ is proportional to a value for which a base is a natural constant and an exponent is a negative value of a distance evaluation value. Therefore, a difference in $P_{add}(i,j)$ is much larger than a difference in a distance evaluation value.

When connection probabilities corresponding to frame groups in $\bar{\epsilon}$, a connection portion is generated between two nodes corresponding to a frame group determined based on the connection probabilities. Because the connection portion to be generated is arbitrarily determined based on the connection probabilities, it is not necessarily determined that a connection portion is generated for a frame group for which a distance evaluation value is the smallest. Therefore, a connection portion for which a distance evaluation value is large may be generated.

According to one or more exemplary embodiments, it may be determined that a connection portion corresponding to the smallest distance evaluation value is generated without obtaining connection probabilities.

Figure 8:
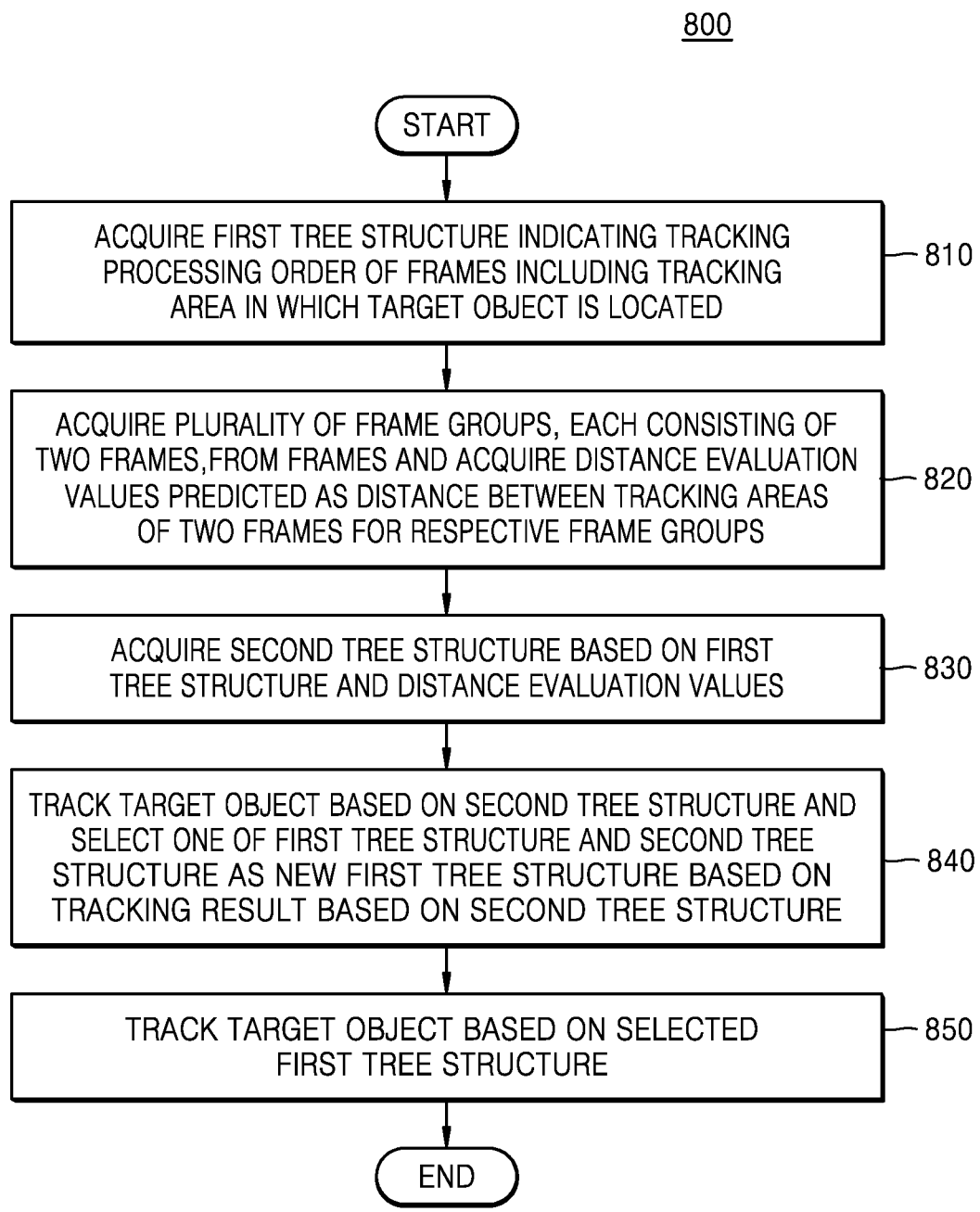
FIG. 8 illustrates a flowchart of a method of tracking a target object in a video, according to another exemplary embodiment.

In FIG. 4B, 8 connection portions 411, 412, 413, 414, 415, 416, 417, and 418 may be generated between the third tree structure and the fourth tree structure. Finally, the connection portion 412 is generated between the node A (410) in the third tree structure and the node D 440 in the fourth tree structure. Accordingly, the third tree structure is connected to the fourth tree structure.

FIG. 4C illustrates the connection portion change operation.

A direction of each connection portion in the structure connected in the connection portion generation operation may be changed from an upper node to a lower node such that the structure connected in the connection portion generation operation becomes a tree structure. As a result of connection portion change operation, the new tree structure 480 is acquired.

For example, although the connection portion 403 (FIG. 4B) between the node C (430) and the node D (440) is oriented from the node C (430) to the node D (440) in FIG. 4B, because the node D (440) is an upper node of the node C (430) in FIG. 4C, a direction of the connection portion 403 between the node C (430) and the node D (440) is changed such that the connection portion 403 is oriented from the node D (440) to the node C (430), and identified as connection portion 421 in FIG. 4C. The new tree structure 480 is acquired through the connection portion change operation.

A method of verifying whether the new tree structure 480 is more efficient than the existing tree structure 400 may be employed.

Figure 5:
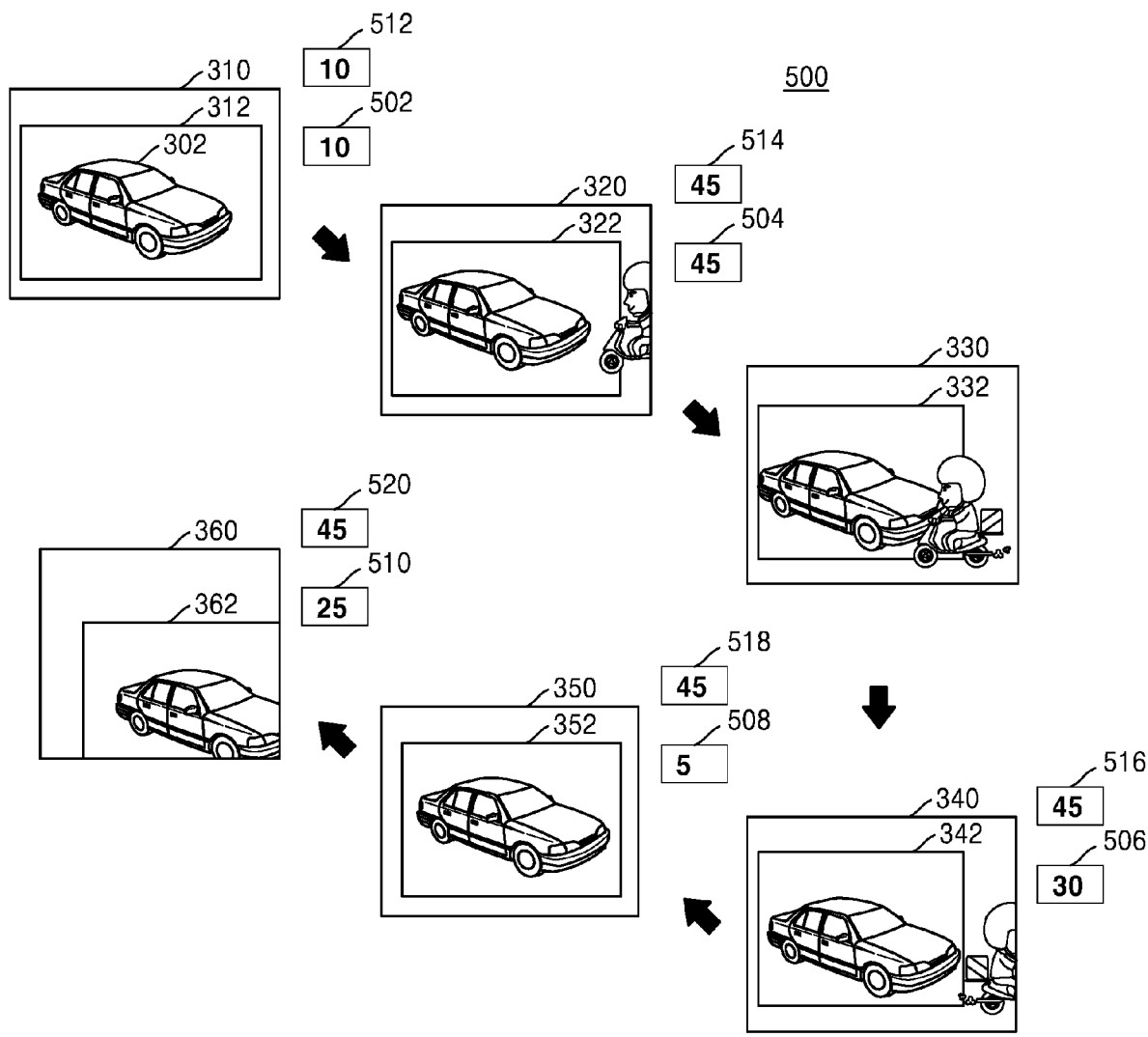
FIGS. 5 and 6 illustrate a method of calculating tree energy to determine efficiency of the new tree structure, according to an exemplary embodiment.
Figure 6:
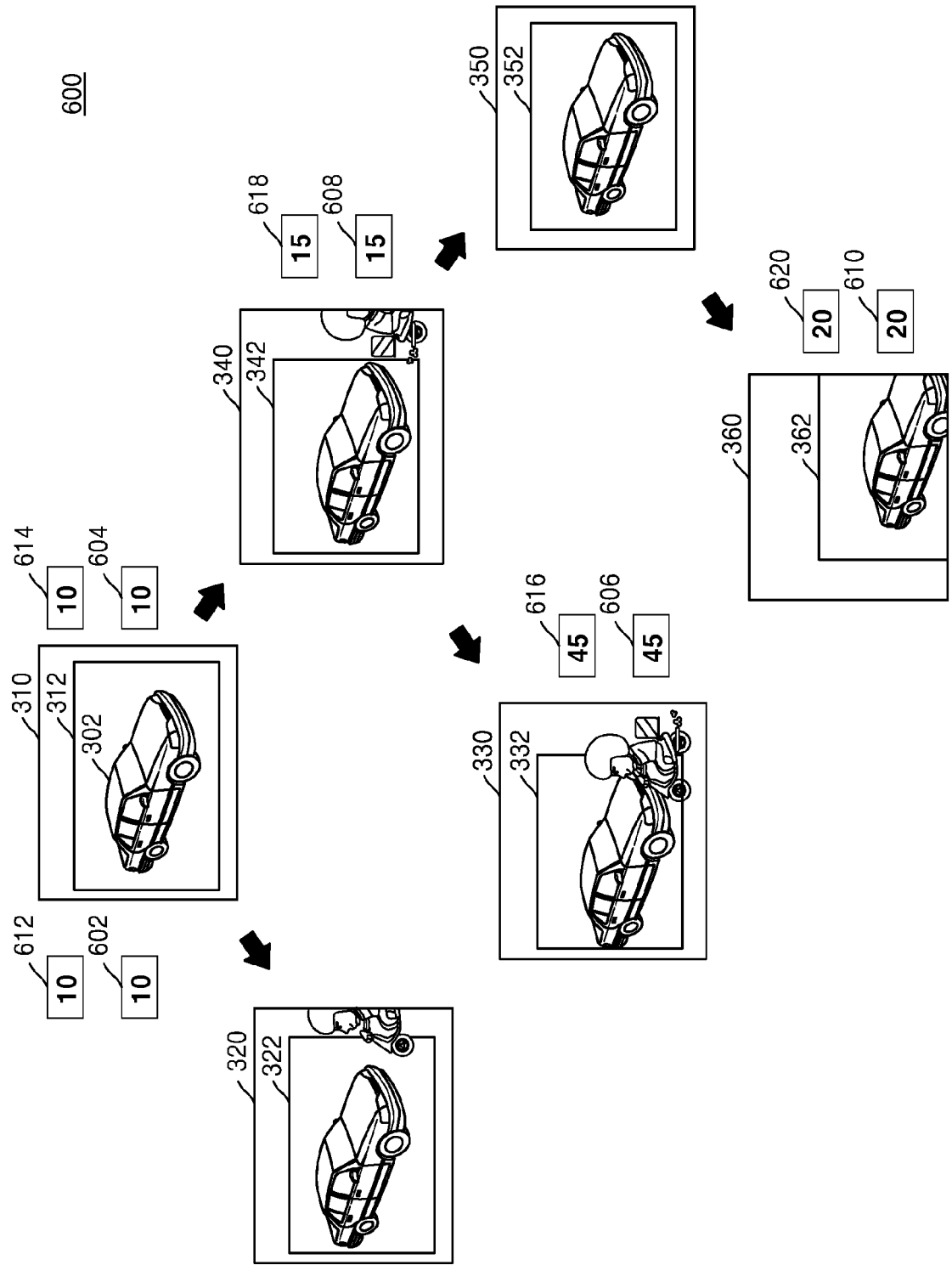

FIGS. 5 and 6 illustrate a method of calculating tree energy of a tree structure to compare an existing tree structure and a new tree structure.

The term "tree energy" is a concept defined to measure efficiency of a tree structure for processing tracking from a root node. The tree energy may be defined by Equation 4.

$$-\log p(y \mid G) = \sum_{i}^{N} c_i = \sum_{i}^{N} \max(d(i, p_i), c_{p_i}) \quad (4)$$

In Equation 4, $c_i$ denotes a tracking cost for tracking a target object from a frame corresponding to a root node to a frame i, $p_i$ denotes an upper node of a node corresponding to the frame i, and $-\log p(\gamma|G)$ denotes tree energy, which is a numeric value indicating how suitable for tracking a tree represented as G is. Because the tree energy is calculated by adding the tracking cost $c_i$ calculated for all nodes belonging to the tree, the lower the tracking cost, i.e., the easier the tracking of the tree is, the lower the tree energy.

Because the tracking cost is defined as $c_i = \max(d(i,p_i), c_{p_i})$, $c_i$ becomes the larger value of a tracking cost in an upper frame of the frame i and a distance evaluation value between the frame i and the upper frame of the frame i. In other words, the largest distance evaluation value acquired during a tracking process from the frame corresponding to the root node to the frame i is the tracking cost of the frame i.

The tree energy is defined as $$-\log p(y|G) = \sum_i^N c_i.$$

Therefore, the tree energy is a sum of all tracking costs acquired during the tracking processing from the frame corresponding to the root node to the frame i.

As indicated by the definition of the tree energy, when a tracking error occurs, the tracking error may be propagated from an upper node to a lower node. In addition, efficiency of a tree structure is affected more in a case in which a tracking error occurs in an upper node than a case in which a tracking error occurs in a lower node. Therefore, the process of acquiring a new tree structure, which has been described with reference to FIGS. 4A to 4C, may be iterated to delete a connection portion for which a tracking error is large and to generate a connection portion for which a tracking error is small, thereby isolating frames from which it is difficult to track a target object in leaf nodes from the tree structure. For example, if it is difficult to track a target object in a frame G based on frames A to F, a node corresponding to the frame G may be located as a lower node of a node corresponding to a frame that is most similar to the frame G among the frames A to F. In addition, the node corresponding to the frame G cannot have a lower node to prevent propagation of a tracking error.

Tree energy is calculated based on a distance evaluation value. The smaller the distance evaluation value, the lower a probability that a tracking error occurs between frames belonging to a frame group corresponding to the distance evaluation value. Thus, the lower the tree energy, the more efficient the tree structure.

Equation 5 determines which one of an existing tree structure and a newly acquired tree structure is selected by comparing the existing tree structure and the newly acquired tree structure based on calculated tree energy.

$$\alpha = \min\left[1, \frac{(-\log p(y^*|G^*))^{-1} Q(G|G^*)}{(-\log p(y|G))^{-1} Q(G^*|G)}\right] \quad (5)$$

In Equation 5, α denotes an acceptance ratio used to determine a probability that a second tree structure is accepted as a new first tree structure, G denotes a first tree structure, G* denotes the second tree structure, Q(G*|G) denotes a tree proposal probability indicating a probability that the second tree structure is proposed from the first tree structure, which is represented by $Q(G^*|G) = P_{delete} \cdot P_{add}$, and Q(G|G*) denotes a tree proposal probability indicating a probability that the first tree structure is proposed from the second tree structure.

According to Equation 5, when a tree proposal probability is not taken into account, if the tree energy of the second tree structure is lower than that of the first tree structure, the second tree structure is unconditionally selected (α=1); otherwise, a probability that the second tree structure is accepted as a new first tree structure is determined in proportional to a ratio of tree energy of the second tree structure to tree energy of the first tree structure $$\left(\alpha = \frac{(-\log p(y^*|G^*))^{-1}}{(-\log p(y|G))^{-1}}\right).$$

FIG. 5 illustrates the existing tree structure. Referring to FIG. 5, tree energy is obtained in a tracking process for the 6 frames A to F (310 to 360). The numeric values located in the lower squares between the frames A to F (e.g., 502, 504, 506, 508, and 510) indicate distance evaluation values. In addition, numeric values located in the upper squares indicate tracking costs (e.g., 512, 514, 516, 518, and 520). For example, the distance evaluation value 502 between the frame A (310) and the frame B (320) is 10, and the frame A (310) corresponds to a root node. Thus, because only the distance evaluation value 502 is acquired, the tracking cost 512 of the frame B (320) is also 10.

The distance evaluation value 504 between the frame B (320) and the frame C (330) is 45 and is greater than the distance evaluation value 502 between the frame A (310) and the frame B (320) (e.g., 10). Thus, the tracking cost 514 of the frame C (330) is also 45. However, the distance evaluation values 506, 508, and 510 acquired thereafter are 30, 5, and 25, respectively. Thus, each of the distance evaluation values 506, 508, and 510 are less than the distance evaluation value 504 between the frame B (320) and the frame C (330) (e.g., 45). Therefore, the tracking costs 516, 518, and 520 of the frames D, E, and F (340, 350, and 360) are each 45.

Therefore, the tree energy is 190, a value obtained by summing all the tracking costs 512, 514, 516, 518, and 520 of the frames B to F (320 to 360).

FIG. 6 illustrates a newly acquired tree structure. A tracking process for the newly acquired tree structure is divided into three directions. According to a process of tracking a target object from the frame A (310) to the frame B (320), a distance evaluation value 602 between the frame A (310) and the frame B (320) is 10. Thus, a tracking cost 612 of the frame B (320) is also 10. Therefore, tree energy acquired in the tracking processing process in a direction towards the frame B (320) is 10.

According to a process of tracking the target object from the frame A (310) to the frame C (330), a distance evaluation value 604 between the frame A (310) and the frame D (340) is 10, and a distance evaluation value 606 between the frame D (340) and the frame C (330) is 45. Therefore, a tracking cost 614 of the frame D (340) is 10, and a tracking cost 616 of the frame C (330) is 45. Accordingly, tree energy acquired in the tracking processing process in a direction towards the frame C (330) is 55.

According to a process of tracking the target object from the frame A (310) to the frame F (360), the distance evaluation value 604 between the frame A (310) and the frame D (340) is 10, a distance evaluation value 608 between the frame D (340) and the frame E (350) is 15, and a distance evaluation value 610 between the frame E (350) and the frame F (360) is 20. Therefore, the tracking cost 614 of the frame D (340) is 10, a tracking cost 618 of the frame E (350) is 15, and a tracking cost 620 of the frame F (360) is 20. Accordingly, tree energy acquired in the tracking process in a direction towards the frame F (360) is 45.

Therefore, when all of the three tracking directions of the new tree structure are taken into account, the highest tree energy is 55, the tree energy calculated in the process of tracking the target object from the frame A (310) to the frame C (330). Because the tree energy calculated in the new tree structure is lower than the tree energy calculated in the existing tree structure, the new tree structure is more efficient than the existing tree structure. Accordingly, in this case, a tracking apparatus selects the new tree structure.

When the tree structure is optimized by iterating the method described above, the tracking error propagation issue from the linear model 200 or the high-order Markov model 250 may be reduced or eliminated.

Figure 7:
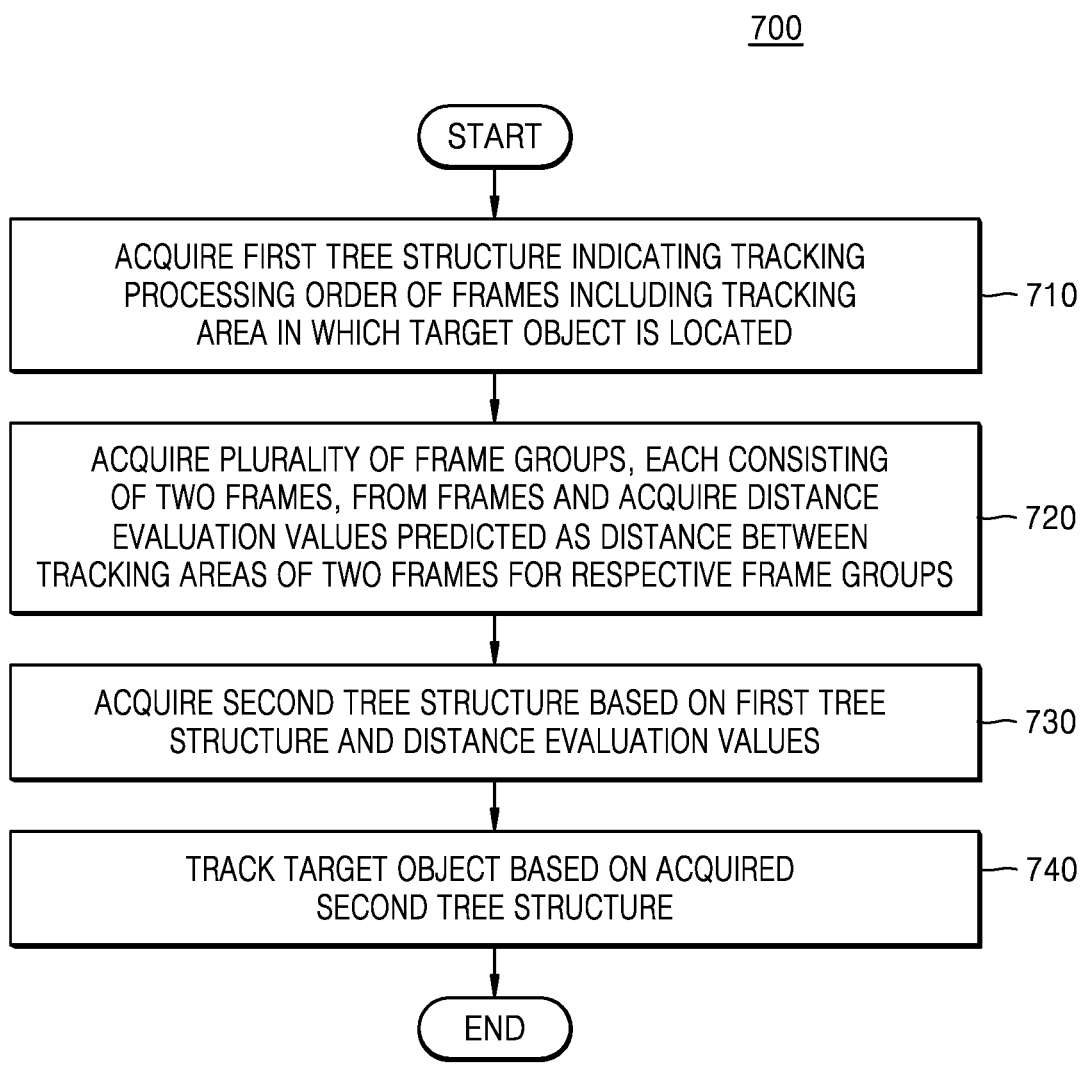
FIG. 7 illustrates a flowchart of a method of tracking a target object in a video, according to an exemplary embodiment.

FIG. 7 illustrates a flowchart of a method of tracking a target object in a video, according to an exemplary embodiment.

In operation 710, a first tree structure is acquired indicating a tracking processing order of frames including a tracking area in which the target object is located.

In operation 720, a plurality of frame groups, each consisting of two frames, are acquired from the frames, and distance evaluation values predicted as a distance between tracking areas of two frames are acquired for the respective frame groups.

In operation 730, a second tree structure is acquired based on the first tree structure acquired in operation 710 and the distance evaluation values acquired in operation 720.

In operation 740, the target object is tracked based on the second tree structure acquired in operation 730.

FIG. 8 illustrates a flowchart of a method of tracking a target object in a video, according to another exemplary embodiment.

In operation 810, a first tree structure indicating a tracking processing order of frames including a tracking area in which the target object is located is acquired.

In operation 820, a plurality of frame groups, each consisting of two frames, are acquired from the frames, and distance evaluation values predicted as a distance between tracking areas of two frames are acquired for the respective frame groups.

In operation 830, a second tree structure is acquired based on the first tree structure acquired in operation 810 and the distance evaluation values acquired in operation 820.

In operation 840, the target object is tracked based on the second tree structure acquired in operation 830, and one of the first tree structure and the second tree structure is selected as a new first tree structure based on a tracking result based on the second tree structure.

In operation 850, the target object is tracked based on the first tree structure selected in operation 840.

FIG. 9 illustrates a flowchart of a method of tracking a target object in a video, according to another exemplary embodiment.

In FIG. 9, N denotes the number of times that operations 920 to 960 have been iterated to optimize a first tree structure. N' denotes the number of iterations of operations 920 to 960 required to optimize the first tree structure. N' may be determined as a certain number or determined adaptively to tree energy of the first tree structure, etc.

In operation 910, N is initialized to 0.

In operation 920, the first tree structure indicating a tracking processing order of frames including a tracking area in which the target object is located is acquired.

In operation 930, a plurality of frame groups, each consisting of two frames, are acquired from the frames, and distance evaluation values predicted as a distance between tracking areas of two frames are acquired for the respective frame groups.

According to one or more exemplary embodiments, a tracking area of a first frame belonging to a frame group may be divided into a predetermined number of first divided areas. Second divided areas matched with the first divided areas of the first frame may be acquired from a second frame belonging to the frame group, and a distance evaluation value determined based on locations of the second divided areas and a location of the tracking area of the first frame may be acquired.

In operation 930, the distance evaluation values may be newly calculated or acquired from existing distance evaluation values.

In operation 940, third and fourth tree structures are acquired by truncating one of connection portions of the first tree structure based on the distance evaluation values of first frame groups, each consisting of two frames corresponding to nodes connected according to the first tree structure.

According to one or more exemplary embodiments, truncation probabilities of the connection portions of the first tree structure may be calculated based on the distance evaluation values of the first frame groups, and a connection portion to be truncated may be determined according to the truncation probabilities.

In operation 950, a second tree structure is acquired by connecting one of the nodes in the third tree structure and one of the nodes in the fourth tree structure according to distance evaluation values of second frame groups, each consisting of one of frames in the third tree structure and one of frames in the fourth tree structure.

According to one or more exemplary embodiments, connection probabilities may be calculated based on the distance evaluation values of the second frame groups, and a node in the third tree structure and a node in the fourth tree structure between which a connection portion is to be generated may be determined based on the connection probabilities.

In operation 960, the target object is tracked based on the second tree structure acquired in operation 950, and one of the first tree structure and the second tree structure is selected based on a tracking result based on the second tree structure. The selected tree structure is determined as a new first tree structure.

According to one or more exemplary embodiments, the tracking result may be determined according to tree energy determined based on dissimilarity between tracking areas included in two adjacent frames. An acceptance ratio to be used to determine a probability that the second tree structure is accepted as the new first tree structure may be determined based on tree energy of the first tree structure and tree energy of the second tree structure. By selecting the new first tree structure from between the first tree structure and the second tree structure based on the acceptance ratio, a tree structure having lower tree energy may be selected from between the first tree structure and the second tree structure with a higher probability.

In operation 970, N increases by 1.

In operation 980, it is determined whether N is N'. If N is N', the method proceeds to operation 990. If N is not equal to N', the method proceeds to operation 920. Therefore, operations 920 to 980 are iterated until N equals N'. The tree energy of the first tree structure may decrease while iterating operations 920 to 980, thereby optimizing the first tree structure.

In operation 990, the target object is tracked based on the first tree structure optimized after iterating operations 920 to 980.

The tracking method, according to one or more exemplary embodiments, may be written as computer-executable programs and may be implemented in general-use digital computers that execute the programs using a non-transitory computer-readable recording medium. Examples of the non-transitory computer-readable recording medium include storage media such as magnetic storage media (e.g., ROM, floppy disks, hard disks, etc.) and optical recording media (e.g., CD-ROMs, or DVDs).

It should be understood that exemplary embodiments described herein should be considered in a descriptive sense only and not for purposes of limitation. Descriptions of features or aspects within each exemplary embodiment should be considered as available for other similar features or aspects in other exemplary embodiments.

While one or more exemplary embodiments have been described with reference to the figures, it should be understood by those of ordinary skill in the art that various changes in form and details may be made therein without departing from the spirit and scope as defined by the following claims.

What is claimed is:

1. A method by which a tracking apparatus tracks a target object in an image, the method comprising:
    acquiring a first tree structure indicating an order of analyzing a plurality of frames, each frame including a tracking area in which the target object is located;
    acquiring a plurality of frame groups, each of the frame groups consisting of two frames, from the plurality of frames, and acquiring a distance evaluation value of each frame group;
    determining truncation probabilities of connection portions of the first tree structure according to distance evaluation values of first frame groups, each of the first frame groups consisting of two frames corresponding to connected nodes in the first tree structure;
    acquiring a third tree structure and a fourth tree structure by randomly truncating one of the connection portions in the first tree structure according to the truncation probabilities of the first frame groups;
    determining connection probabilities according to distance evaluation values of second frame groups, each of the second frame groups consisting of a frame in the third tree structure and a frame in the fourth tree structure;
    acquiring a second tree structure by randomly connecting a node in the third tree structure and a node in the fourth tree structure according to the connection probabilities of the second frame groups; and
    tracking the target object based on the acquired second tree structure,
    wherein each of the distance evaluation values is determined based on at least one of locations of tracking areas included in two frames belonging to each of the frame groups and pixel values in the tracking areas.

2. The method of claim 1, wherein the first tree structure and the second tree structure comprise a plurality of nodes corresponding to the plurality of frames and connection portions for connecting the nodes, and
    wherein the target object in each frame corresponding to each node is tracked in a connection order to a root node by tracking the target object from the frame corresponding to the root node.

3. The method of claim 1, further comprising tracking the target object based on the second tree structure and selecting one of the first tree structure and the second tree structure as a new tree structure based on a result of the tracking the target object based on the second tree structure.

4. The method of claim 1, wherein the acquiring of the distance evaluation values comprises dividing a tracking area of a first frame of each frame group into a predetermined number of first divided areas, acquiring second areas matched with the first divided areas of the first frame from a second frame of each frame group, and acquiring a distance evaluation value based on locations of the second divided areas and a location of the tracking area.

5. The method of claim 3, wherein the selecting comprises:
    determining a tree energy based on a dissimilarity between tracking areas included in two frames in the second tree structure;
    determining an acceptance ratio for determining a probability that the second tree structure is selected as the new tree structure, based on the tree energy of the first tree structure and the tree energy of the second tree structure; and
    selecting the new tree structure from the first tree structure and the second tree structure based on the acceptance ratio.

6. The method of claim 3, wherein the tracking of the target object comprises tracking the target object according to the first tree structure acquired by iterating the acquiring of the first tree structure, the acquiring of the distance evaluation values, the acquiring of the second tree structure, and the selecting of the first tree structure.

7. A tracking apparatus for tracking a target object in an image, the tracking apparatus comprising:
    at least one memory configured to store instructions; and
    at least one processor configured to execute the stored instructions to:
        acquire a first tree structure indicating an order of analyzing a plurality of frames, each of the frames including a tracking area in which the target object is located;
        acquire a plurality of frame groups, each of the frame groups consisting of two frames, from the plurality of frames, and acquire a distance evaluation value of each frame group;
        determine truncation probabilities of connection portions of the first tree structure according to distance evaluation values of first frame groups, each of the first frame groups consisting of two frames corresponding to connected nodes in the first tree structure;
        acquire a third tree structure and a fourth tree structure by randomly truncating one of the connection portions in the first tree structure according to the truncation probabilities of the first frame groups;
        determine connection probabilities according to distance evaluation values of second frame groups, each of the second frame groups consisting of a frame in the third tree structure and a frame in the fourth tree structure;
        acquire a second tree structure by randomly connecting a node in the third tree structure and a node in the fourth tree structure according to the connection probabilities of the second frame groups; and
        track the target object based on the acquired second tree structure,
    wherein each of the distance evaluation values is determined based on at least one of locations of tracking areas included in two frames belonging to each of the frame groups and pixel values in the tracking areas.

8. The tracking apparatus of claim 7, wherein the first tree structure and the second tree structure comprise a plurality of nodes corresponding to the plurality of frames, and a plurality of connection portions configured to connect the nodes, and
    wherein the target object in each frame corresponding to each node is tracked in a connection order to a root node by tracking the target object from the frame corresponding to the root node.

9. The tracking apparatus of claim 7, wherein the at least one processor is further configured to execute the stored instructions to track the target object based on the second tree structure and select one of the first tree structure and the second tree structure as a new tree structure based on a result of the tracking the target object based on the second tree structure.

10. The tracking apparatus of claim 7, wherein the at least one processor is further configured to execute the stored instructions to divide a tracking area of a first frame of each of the frame groups into a predetermined number of first divided areas, acquire second areas matched with the first divided areas of the first frame from a second frame of each of the frame groups, and acquire a distance evaluation value based on locations of the second divided areas and a location of the tracking area.

11. The tracking apparatus of claim 9, wherein the at least one processor is further configured to execute the stored instructions to:
   determine a tree energy based on a dissimilarity between tracking areas included in two adjacent frames in the second tree structure,
   determine an acceptance ratio for determining a probability that the second tree structure is selected as the new tree structure, based on the tree energy of the first tree structure and the tree energy of the second tree structure, and
   select the new tree structure from the first tree structure and the second tree structure based on the acceptance ratio.

12. The tracking apparatus of claim 9, wherein the at least one processor is further configured to execute the stored instructions to track the target object according to the first tree structure acquired by iterating the acquiring of the first tree structure, the acquiring of the distance evaluation values, the acquiring of the second tree structure, and the selecting of the first tree structure.

13. A non-transitory computer-readable recording medium having recorded thereon a computer-readable program for executing the method of claim 1.

14. A method of tracking a target object in an image, the method comprising:
   obtaining a first tree structure indicating an order of analyzing a plurality of frames, each frame including a tracking area in which the target object is located;
   obtaining a plurality of frame groups, wherein each of the frame groups comprises a pair of adjacent frames;
   determining a distance evaluation value for each frame group that corresponds to a similarity between frames in each of the frame groups;
   determining truncation probabilities of connection portions of the first tree structure according to distance evaluation values of first frame groups, each of the first frame groups consisting of two frames corresponding to connected nodes in the first tree structure;
   acquiring a third tree structure and a fourth tree structure by randomly truncating one of the connection portions in the first tree structure according to the truncation probabilities of the first frame groups;
   determining connection probabilities according to distance evaluation values of second frame groups, each of the second frame groups consisting of a frame in the third tree structure and a frame in the fourth tree structure;
   acquiring a second tree structure by randomly connecting a node in the third tree structure and a node in the fourth tree structure according to the connection probabilities of the second frame groups; and
   tracking the target object according to the acquired second tree structure.

* * * * *